United States Patent [19]
Westerman

[11] Patent Number: 6,088,066
[45] Date of Patent: Jul. 11, 2000

[54] SYSTEM FOR TEMPORARILY DISPLAYING MONOCHROME IMAGES ON A COLOR DISPLAY

[76] Inventor: Larry Alan Westerman, 3707 NW. Thurman St., Portland, Oreg. 98682

[21] Appl. No.: 09/042,214

[22] Filed: Mar. 13, 1998

[51] Int. Cl.[7] ...................................................... H04N 9/70
[52] U.S. Cl. ........................... 348/643; 348/557; 348/708
[58] Field of Search .................................. 348/554, 557, 348/643, 644, 708; H04N 9/70

[56] References Cited

U.S. PATENT DOCUMENTS

| | | | |
|---|---|---|---|
| 4,253,108 | 2/1981 | Engel | 358/26 |
| 4,298,884 | 11/1981 | Reneau | 358/26 |
| 5,452,016 | 9/1995 | Ohara et al. | 348/644 |
| 5,654,769 | 8/1997 | Ohara et al. | 348/644 |

*Primary Examiner*—Sherrie Hsia
*Attorney, Agent, or Firm*—Kevin L. Russell; Chernoff Vilhauer McClung & Stenzel

[57] ABSTRACT

The system for viewing color video "automatically" enables and disables a color killer circuit (monochrome/color mode) so that the color video may be viewed in monochrome. Enabling and disabling the color killer circuit for the current system may be accomplished, in part, by dynamic operation of the television. In operation the user may select one of three methods of activating the monochrome/color mode to enable the color killer circuit. First, the monochrome/color mode may be activated for one or more preselected channels. Second, the monochrome/color mode may be activated for all channels. Third, the monochrome/color mode may be activated if a control signal is included within the television broadcast indicating that the particular video being received is a colorized monochrome video. To deactivate the monochrome/color mode may be accomplished by any of four deactivation methods that disable the color killer circuit. First, the monochrome/color mode may be deactivated by turning the television off and on. Second, the monochrome/color mode may be deactivated by the user manually turning it off. Third, the monochrome/color mode may be deactivated by the absence of the control signal. Fourth, the monochrome/color mode may be deactivated by selecting a channel that is not selected to be displayed in monochrome.

32 Claims, 2 Drawing Sheets

SYSTEM FOR TEMPORARILY DISPLAYING MONOCHROME IMAGES ON A COLOR DISPLAY

BACKGROUND OF THE INVENTION

The present invention relates to a system for displaying color video as monochrome video on a color display, and more particularly to a system for automatically enabling and disabling a color killer circuit.

Contemporary color televisions incorporate control mechanisms for adjusting the chroma (intensity) and hue (shading) of the color television. Adjusting the chroma and the hue allows the video to be viewed in a manner suitable to a viewer's particular preferences. For example, some users prefer a bright image while other users prefer a dimmer image. A user typically adjusts the chroma and the hue merely once upon purchasing the television, and at most infrequently during the life of the television. Accordingly, the chroma and the hue are adjusted and remain unchanged regardless of whether the television is turned off, the power to the television is disconnected, or the television channel is changed. Moreover, after the chroma and the hue are properly adjusted, a user typically has no desire to modify them.

In recent years many video content providers have started to broadcast, or to otherwise provide for viewing, video such as classic movies originally filmed in black and white (monochrome), to which color has been artificially added. This process is generally known as colorizing. Although colorizing has been criticized as being somewhat artificial in appearance, many viewers enjoy watching colorized classic monochrome video.

However, to a significant number of viewers the colorization of classic monochrome video represents an intrusive alteration of the video's original content. By adjusting the chroma, the effects of the colorization of classic monochrome movies can be eliminated so that movies are displayed in monochrome. Thereafter, the user must readjust the chroma, preferably to its original setting, to view subsequent videos in color. Unfortunately, readjusting of the chroma is difficult if the user has forgotten the original chroma setting. In such a case, the user may adjust the chroma several times until a suitable image is achieved. Unfortunately, adjusting the chroma is time consuming, difficult, and frustrating if the original setting is forgotten.

Several known systems use a color killer circuit to eliminate color information and thereby convert color images to monochrome images. When the color killer circuit is enabled, colorized video is shown in black and white (monochrome). When the color killer circuit is disabled, colorized video is shown in color. Three patents that disclose such systems with color killer circuits are Engel, Reneau, and Ohara et al.

Engel U.S. Pat. No. 4,253,108 describes a color television receiver control system for enabling and disabling the limiting action of an automatic color limiter circuit. The color limiter circuit varies the threshold at which the color killer circuit inhibits reproduction of color images. Alteration of the operation of the automatic color limiter circuit and the color killer circuit may be effected manually or automatically. The color killer circuit is responsive to one of two conditions, namely, a relatively low amplitude input color signal or a relatively high amplitude input color signal. In either case, the system monitors the amplitude of the input color signal and enables the color killer circuit if the threshold happens to meet certain criteria. Such a system is unsuitable for the viewing of colorized videos in monochrome because the color killer circuit cannot be enabled regardless of the amplitude of the input color signal.

Reneau U.S. Pat. No. 4,298,884 describes a chroma amplifier that activates a color killer circuit based upon the received color signal strength. Like the Engel system, the Reneau system is unsuitable for the viewing of colorized movies in monochrome because the color killer circuit cannot be enabled regardless of the amplitude of the input color signal.

Ohara et al., U.S. Pat. No. 5,452,016 describe a color control circuit which sets a control line based on the relation of a received input color signal and a killer level. If the level of the input color signal fails to meet the killer level, then a coefficient controller controls a coefficient generated by a coefficient generator to perform a killer operation, thereby displaying the color video in monochrome. Like the systems discussed above, the Ohara et al. system is unsuitable for the viewing of colorized movies in monochrome because the color killer circuit cannot be enabled regardless of the amplitude of the input color signal.

Many televisions include on-screen programming to permit adjustments to the televisions settings. Some settings include, for example, a sleep timer, closed captioning, stereo, tone, alarm, clock, color, tint, brightness, sharpness, autocolor, and speakers. Such settings are adjusted and then the television operates as adjusted until the on-screen programming is reactivated to modify the settings. At least one television manufacturer markets a television with an on-screen programming monochrome/color option that displays the color video input signal in monochrome. Accordingly, when a user desires to view a video in monochrome, and in particular a colorized monochrome movie, the user activates the on-screen programming to activate the monochrome/color option for all channels. The television continues to display color in monochrome until the on-screen programming is reactivated and the monochrome/color option is deactivated so color video is displayed in color.

Unfortunately, many users of such a television may be unaware that a monochrome/color option exists under the on-screen programming feature that avoids the need to manually adjust the chroma. When the television is displaying images in monochrome, an unaware user may mistakenly believe that the television is broken. Attempting to repair a properly operating television, albeit displaying color video in monochrome, may entail adjusting the antenna, contacting the broadcast company, contacting the cable company, contacting the satellite content provider, adjusting the chroma and thereby disturbing its setting, adjusting the tuning, and in desperation striking the television in a desperate hope that the color will return. One potential solution is to place a sign on the television explaining the monochrome/color option, but this is burdensome and necessitates an undesirable sign obstructing the viewing area.

What is desired, therefore, is a television that does not burden unaware users with the potential misconception that when displaying monochrome video the television is not functioning properly. In addition, the television should permit automatic activation and deactivation of the color killer circuit.

BRIEF SUMMARY OF THE INVENTION

The present invention overcomes the aforementioned drawbacks of the prior art by providing a system for viewing color video in such a way that it "automatically" enables and disables a color killer circuit (morochrome/color mode) so that the color video may be viewed in monochrome. Enabling and disabling the color killer circuit for the current system may be accomplished, in part, by dynamic operation of the television.

In operation the user may select one of three methods of activating the monochrome/color mode to enable the color killer circuit. First, the monochrome/color mode may be activated for one or more preselected channels. Second, the monochrome/color mode may be activated for all channels. Third, the monochrome/color mode may be activated if a control signal is included within the television broadcast indicating that the particular video being received is a colorized monochrome video.

Deactivating the monochrome/color mode may be accomplished by any of four deactivation methods that disable the color killer circuit. First, the monochrome/color mode may be deactivated by turning the television off and on. Second, the monochrome/color mode may be deactivated by the user manually turning it off. Third, the monochrome/color mode may be deactivated by the absence of the control signal. Fourth, the monochrome/color mode may be deactivated by selecting a channel that is not selected to be displayed in monochrome.

Users of a television that includes the monochrome/color mode are thus less likely to mistakenly believe that the television is broken because of its "automatic" nature. Accordingly, the unaware user will be less likely to mistakenly attempt to repair such a television at added expense and aggravation. In addition, the user aware of the monochrome/color mode will have the benefit of a dynamic operation of the monochrome/color mode to permit viewing of colorized monochrome video without using the on-screen programming functions of the television.

DETAILED DESCRIPTION OF THE PREFERRED EMBODIMENT

Unlike the traditional set-and-leave static operation of traditional on-screen programming, the present invention includes a monochrome/color mode selection option of the on-screen programming that may be designed to include an automatic selection characteristic. The automatic selection characteristic activates the monochrome/color mode based upon the occurrence of preselected activation events and likewise deactivates the monochrome/color mode based upon the occurrence of preselected deactivation events. By designing a particular on-screen programming setting with automatic features, while the remaining settings retain their static characteristics, the monochrome/color mode provides the user with benefits, described in detail below. In addition, with the proper design of the automatic selection characteristics of the monochrome/color mode, the user can view colorized monochrome video in monochrome with minimal effort. An automatic selection capability for a monochrome/color mode that enables/disables a color killer circuit so that colorized monochrome video may be viewed in monochrome is in contrast to the teachings of Engel, Reneau, and Ohara et al. described in the background herewith. Accordingly, one would not normally be motivated to design an "automatic" color killer circuit that functions regardless of the amplitude of the input color circuit.

Figure 1:
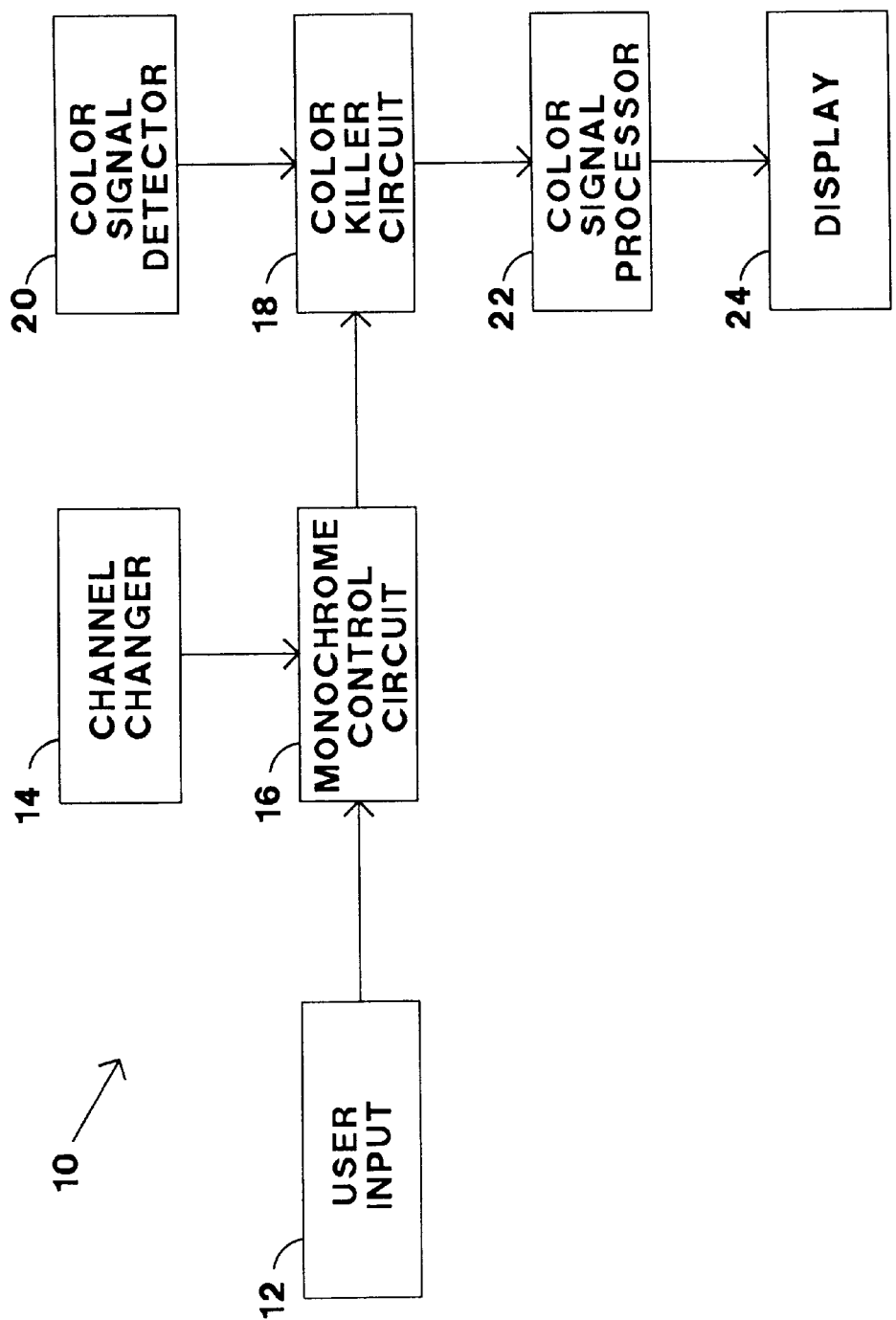
FIG. 1 is a block diagram of a system for viewing color video that includes a monochrome control circuit.

Referring to FIG. 1, a television system 10 includes a user input 12 and a remote control unit 14 connected to a monochrome control circuit 16. The user input 12 is preferably control buttons on the television itself. The monochrome control circuit 16 enables and disables a color killer circuit 18. When enabled, the color killer circuit 18 receives the color input signals detected by the color signal detector 20 which are processed by the color signal processor 22 in a manner to display the color input signals in monochrome on the color display 24. When disabled, the color killer circuit 18 allows the color input signals to be displayed in color.

Figure 2:
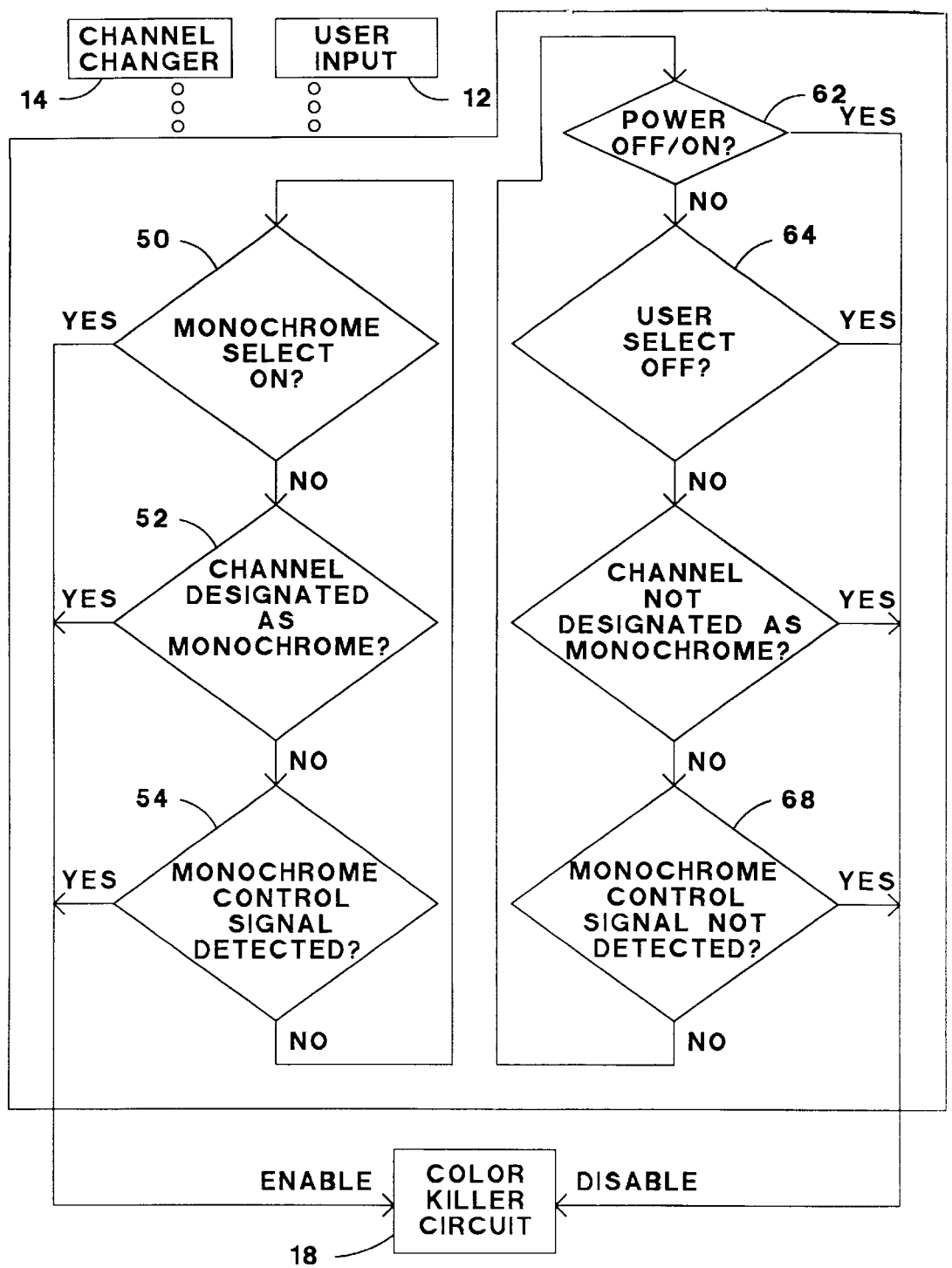
FIG. 2 is a block diagram of the monochrome control circuit of FIG. 1.

Referring to FIG. 2, the remote control unit 14 and the user input 12 both preferably operate using on-screen programming to activate and deactivate the monochrome/color mode. When the monochrome/color mode is activated, the color killer circuit 18 is enabled and video is shown in monochrome. When the monochrome/color mode is deactivated, the color killer circuit 18 is disabled and video may be shown in color. The monochrome/color mode is preferably activated by one or more of three different options.

The first option, shown at decision block 50, is to select or activate the monochrome/color mode at decision block 50 for all channels. In this mode all channels will be displayed in monochrome because the color killer circuit 18 is enabled.

The second option is to select or activate the monochrome/color mode for one or more preselected channels. This option is shown in decision block 52. By selecting the desired channels, such as those channels specializing in colorized classic monochrome movies, those channels will be automatically displayed in monochrome. Decision block 52 enables the color killer circuit 18 when one of the preselected channels is being displayed. This relieves the user from having to manually activate the monochrome/color mode each time colorized monochrome video is viewed on one of the preselected channels. Further, the user is relieved from reactivating the on-screen programming to deactivate the monochrome/color mode when nonselected channels are desired to be displayed in color, which is likely the primary use of the television. Accordingly, users will not mistakenly believe that the television is functioning improperly because video on all channels not selected to be displayed in monochrome will display in color as anticipated. In addition, activating the monochrome/color mode for selected channels relieves the user from manually selecting or activating the monochrome/color mode to view colorized monochrome video, and in particular the channels that frequently display such video.

The third option is available if a control signal is included within, or otherwise associated with, the television broadcast indicating that the particular video being received is a colorized monochrome video. Decision block 54 detects whether the control signal within the broadcast indicates that the video is a colorized monochrome video, and in that case activates the color killer circuit 18. Accordingly, users will not mistakenly believe that the television is functioning improperly because most video will be displayed in color, as expected. In addition, activating the monochrome/color mode in response to the control signal relieves the user from having to manually select or activate the monochrome/color mode in order to view colorized monochrome video in monochrome.

The television automatically disables, in many circumstances, the color killer circuit 18 to deactivate the monochrome/color mode. This relieves the user from having to manually deselect the monochrome/color mode. The disabling of the color killer circuit 18 may be accomplished by any one of at least four options.

The first option, shown at decision block 62, is turning the television off and on, or otherwise interrupting the power to the television, to deactivate the monochrome/color mode so that all channels are displayed in color. In the event that the monochrome/color mode is inadvertently left activated, this option provides a convenient way to reset the television to display all channels in color. Further, for users unaware of the monochrome/color mode and frustrated by a monochrome display, they will inevitably turn the television on and off, and thereby reset the television to display all channels in color. This reduces the likelihood that an unwary user will attempt to repair such a television by adjusting the antenna, contacting the cable company, contacting the satellite content provider, adjusting the chroma and thereby messing up its settings, adjusting the tuning, and in desperation striking the television in a desperate hope that the color will return.

The second option is to deactivate the monochrome/color mode by the user manually deactivating it at decision block 64. This is preferably accomplished manually by activating the on-screen programming to deactivate the monochrome/color mode.

The third option is to detect the absence of the control signal within, or otherwise in association with, the television broadcast indicating that the particular channel being received is not a colorized movie. Decision block 68 detects whether the control signal within the broadcast indicates that the channel being viewed is a colorized monochrome video, and if it is, disables the color killer circuit 18. Accordingly, users will riot frequently be mistaken that the television is functioning improperly because most videos will be displayed in color, as most video is not colorized monochrome video. In addition, this option relieves the user from having to manually deactivate the monochrome/color mode to view color video.

The fourth option is to disable the color killer circuit 18 for the particular channels not selected to be displayed in monochrome. This relieves the user from being required to deactivate the monochrome/color mode when colorized monochrome video is to be viewed on channels not designated as monochrome, in order to view color video in color. Further, the user is relieved from returning to the on-screen programming to deactivate the monochrome/color mode when channels are desired to be viewed in color, which is likely the typical use of the television. Decision block 62 preferably does not reset the preselected channels. Accordingly, users will not mistakenly believe that the television is not functioning properly because video on all channels not selected to be displayed in monochrome will display in color, as expected by an unsuspecting user.

In operation the user may select one of the three aforementioned methods of activating the monochrome/color mode to enable the color killer circuit 18. To deactivate the monochrome/color mode may be accomplished by any of the four aforementioned deactivation methods that disable the color killer circuit 18. Enabling and disabling the color killer circuit 18 for the current system may be accomplished, in part, by dynamic operation of the television. Users of the monochrome/color mode are thus less likely to mistakenly believe that the television is broken. Accordingly, the unaware user will not mistakenly attempt to repair such a television by adjusting the antenna, contacting the cable company, contacting the satellite content provider, adjusting the chroma thereby messing up its settings, adjusting the tuning, and in desperation striking the television in a desperate hope that the color will return. In addition, the user aware of the monochrome/color mode will have the benefit of a dynamic operation of the monochrome/color mode to permit viewing of colorized monochrome video without using the on-screen programming functions of the television.

It is to be understood that other display systems may likewise be used, such as, for example, digital television, monitors, flat panel displays, and computers with a television tuner card. It is to be understood that in a digital television set, an identical color killing result may be achieved by setting the Cb and Cr color difference coefficients to appropriate neutral values. Alternatively, the transform matrix which generates red, green, and blue values from the luminance and chrominance values can be altered to yield equal red, green, and blue values regardless of the actual chrominance values.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by. the claims which follow.

I claim:

1. A method of viewing a video on a color display device suitable for displaying a plurality of separate channels in color, comprising the steps of:
   (a) receiving a color video;
   (b) selectively enabling a color killer circuit in response to the selection of one of said channels;
   (c) converting said color video to a monochrome video when said color killer circuit is selectively enabled as a result of step (b); and
   (d) displaying said monochrome video on said color display device.

2. The method of claim 1 wherein said color display device is a television.

3. The method of claim 2 wherein said television is a digital television.

4. The method of claim 2 wherein said television is an anlog television.

5. The method of claim 1 further comprising the steps of:
   (a) Selectively enabling said color killer circuit in response to a control signal received in association with said color video indicating that said color video is a colorized video of an original monochrome video; and
   (b) converting said color video to said monochrome video when said color killer circuit is selectively enabled as a result of step (a).

6. The method of claim 1 further comprising the steps of:
   (a) enabling said color killer circuit that converts said color video to said monochrome video for displaying on said display device; and
   (b) selectively disabling said color killer circuit in response to the selection of a second one of said separate channels.

7. The method of claim 1 further comprising the steps of:
   (a) enabling said color killer circuit that converts said color video to said monochrome video for displaying on said display device; and
   (b) selectively disabling said color killer circuit in response to the absence of a control signal received in association with said color video indicating that said color video is a colorized video of an original monochrome video.

8. The method of claim 1 further comprising the steps of:
  (a) enabling said color killer circuit that converts said color video to said monochrome video for displaying on said display device; and
  (b) selectively disabling said color killer circuit in response to the combination of the selection of deactivating said color display device and reactivating said color display device.

9. A method of viewing a video on a color display device suitable for displaying a plurality of separate channels in color, comprising the steps of:
  (a) receiving a color video;
  (b) selectively enabling a color killer circuit in response to a control signal received in association with said color video indicating that said color video is a colorized video of an original monochrome video;
  (c) converting said color video to said monochrome video when said color killer circuit is selectively enabled as a result of step (b); and
  (d) displaying said monochrome video on said color display device.

10. The method of claim 9 wherein said color display device is a television.

11. The method of claim 10 wherein said television is a digital television.

12. The method of claim 10 wherein said television is an analog television.

13. The method of claim 9 further comprising the steps of:
  (a) selectively enabling said color killer circuit in repsonse to the selection of one of said channels; and
  (b) converting said color video to said monochrome video when said color killer circuit is selectively enabled as a result of step (a).

14. The method of claim 9 further comprising the steps of:
  (a) enabling said color killer circuit that converts said color video to said monochrome video for displaying on said display device; and
  (b) selectively disabling said color killer circuit in response to the selection of a second one of said separate channels.

15. The method of claim 9 further comprising the steps of:
  (a) enabling said color killer circuit that converts said color video to said monochrome video for displaying on said display device; and
  (b) selectively disabling said color killer circuit in response to the absence of said control signal received in association with said color video indicating that said color video is said colorized video of said original monochrome video.

16. The method of claim 9 further comprising the steps of:
  (a) enabling said color killer circuit that converts said color video to said monochrome video for displaying on said display device; and
  (b) selectively disabling said color killer circuit in response to the combination of the selection of deactivating said color display device and reactivating said color display device.

17. A method of viewing a video on a color display device suitable for displaying a plurality of separate channels in color, comprising the steps of:
  (a) receiving a first color video for a first one of said separate channels;
  (b) enabling a color killer circuit that converts said first color video to a monochrome video for displaying on said display device;
  (c) selectively disabling said color killer circuit in response to the selection of a second color video for a second one of said separate channels; and
  (d) displaying said second color video on said color display device in color.

18. The method of claim 17 wherein said color display device is a television.

19. The method of claim 18 wherein said television is a digital television.

20. The method of claim 18 wherein said television is an analog television.

21. The method of claim 17 further comprising the steps of:
  (a) selectively enabling said color killer circuit in response to the selection of one of said channels; and
  (b) converting a third color video corresponding to said channel of step (a) to said monochrome video when said color killer circuit is selectively enabled as a result of step (a).

22. The method of claim 17 further comprising the steps of:
  (a) enabling said color killer circuit that converts a third color video to said monochrome video for displaying on said display device; and
  (b) selectively disabling said color killer circuit in response to the absence of a control signal received in association with said third color video indicating that said third color video is a colorized video of an original monochrome video.

23. The method of claim 17 further comprising the steps of:
  (a) enabling said color killer circuit that converts a third color video to said monochrome video for displaying on said display device; and
  (b) selectively disabling said color killer circuit in response to the combination of the selection of deactivating said color display device and reactivating said color display device.

24. A method of viewing a video on a color display device suitable for displaying a plurality of separate channels in color, comprising the steps of:
  (a) receiving a color video for a first one of said separate channels;
  (b) enabling a color killer circuit that converts said color video to a monochrome video for displaying on said display device;
  (c) selectively disabling said color killer circuit in response to the absence of a control signal received in association with said color video indicating that said color video is a colorized video of an original monochrome video;
  (d) displaying said color video on said color display device in color.

25. The method of claim 24 wherein said color display device is a television.

26. The method of claim 25 wherein said television is a digital television.

27. The method of claim 25 wherein said television is an analog television.

28. The method of claim 24 further comprising the steps of:
   (a) Selectively enabling said color killer circuit in response to said control signal received in association with said color video indicating that said color video is said colorized video of said original monochrome video; and
   (b) converting said color video to said monochrome video when said color killer circuit is selectively enabled as a result of step (a).

29. The method of claim 24 further comprising the steps of:
   (a) enabling said color killer circuit that converts said color video to said monochrome video for displaying on said display device; and
   (b) selectively disabling said color killer circuit in response to the selection of a second one of said separate channels.

30. The method of claim 24 further comprising the steps of:
   (a) selectively enabling said color killer circuit in response to the selection of one of said channels; and
   (b) converting said color video to said monochrome video when said color killer circuit is said selectively enabled as a result of step (a).

31. The method of claim 24 further comprising the steps of:
   (a) enabling said color killer circuit that converts said color video to said monochrome video for displaying on said display device; and
   (b) selectively disabling said color killer circuit in response to the combination of the selection of deactivating said color display device and reactivating said color display device.

32. A method of viewing a video on a color display device suitable for displaying a plurality of separate channels in color, comprising the steps of:
   (a) receiving a color video for a first one of said separate channels;
   (b) enabling a color killer circuit that converts said color video to a monochrome video for displaying on said display device;
   (c) selectively disabling said color killer circuit in response to the combination of the selection of deactivating said color display device and reactivating said color display device;
   (d) displaying said color video on said color display device in color.

* * * * *

UNITED STATES PATENT AND TRADEMARK OFFICE
CERTIFICATE OF CORRECTION

PATENT NO.    : 6,088,066
DATED         : July 11, 2000
INVENTOR(S)   : Larry Alan Westerman It is certified that error appears in the above-identified patent and that said Letters Patent is hereby corrected as shown below:

Column 5,
Line 35, change "riot" to -- not --

Column 6,
Line 27, change "by." to -- by --
Line 48, change "Selectively" to -- selectively --
Line 46, change "anlog" to -- analog --

Column 9,
Line 3, change "Selectively" to -- selectively --

Signed and Sealed this

Twenty-third Day of April, 2002

Attest:

Attesting Officer

JAMES E. ROGAN
*Director of the United States Patent and Trademark Office*